(12) United States Patent
Sevindik

(10) Patent No.: US 11,855,743 B2
(45) Date of Patent: Dec. 26, 2023

(54) WIRELESS NETWORK AND INTERFERENCE CONTROL

(71) Applicant: Charter Communications Operating, LLC, St. Louis, MO (US)

(72) Inventor: Volkan Sevindik, Reston, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 123 days.

(21) Appl. No.: 17/482,893

(22) Filed: Sep. 23, 2021

(65) Prior Publication Data

US 2023/0087814 A1 Mar. 23, 2023

(51) Int. Cl.
| | | |
|---|---|---|
| H04B 7/155 | (2006.01) | |
| H04B 17/345 | (2015.01) | |
| H04W 88/04 | (2009.01) | |

(52) U.S. Cl.
CPC ..... *H04B 7/15542* (2013.01); *H04B 7/15535* (2013.01); *H04B 17/345* (2015.01); *H04W 88/04* (2013.01)

(58) Field of Classification Search
CPC ............ H04B 7/15542; H04B 7/15535; H04B 17/345; H04W 88/04
See application file for complete search history.

(56) References Cited

U.S. PATENT DOCUMENTS

| | | | |
|---|---|---|---|
| 2004/0160376 A1* | 8/2004 | Hornsby | ............ H04B 7/15571 |
| | | | 343/770 |
| 2019/0363448 A1* | 11/2019 | Yemelong | ............... H04B 7/145 |
| 2020/0336168 A1 | 10/2020 | Hormis et al. | |
| 2021/0306959 A1* | 9/2021 | Abedini | ................ H04W 52/52 |
| 2022/0103247 A1* | 3/2022 | Abedini | ............... H04B 7/0695 |

\* cited by examiner

*Primary Examiner* — Ashley Shivers
(74) *Attorney, Agent, or Firm* — Armis IP Law, LLC

(57) ABSTRACT

A network environment includes a repeater wireless station. The repeater wireless station receives a first wireless signal from a wireless base station. The repeater wireless station transmits a second wireless signal from the repeater wireless station. The second wireless signal is a reproduction of the first wireless signal. When transmitting the second wireless signal, the repeater wireless station controls a phase shift of the second wireless signal with respect to a timing of the received first wireless signal to reduce wireless interference in the network environment.

28 Claims, 10 Drawing Sheets

WIRELESS NETWORK AND INTERFERENCE CONTROL

BACKGROUND

Conventional wireless networks typically include one or more wireless base stations to provide mobile communication devices access to a remote network such as the Internet. One type of base station is a so-called CBSD (Citizen Broadband Radio Service Device). Such a device uses a wireless channel allocated from a CBRS (Citizens Band Radio Service) to support communications with one or more mobile communication devices.

Typically, one or more wireless channels is allocated to a base station by a SAS (Spectrum Access System) to support communications with one or more mobile communication devices or so-called customer premises equipment. For example, a base station can be configured to communicate with the SAS to receive notification of one or more wireless channels allocated for its use.

Subsequent to registration and wireless channel allocation, the wireless base station communicates so-called heartbeat request messages to the spectrum access system in order to continue use of the allocated one or more wireless channels. For example, the customer premises equipment is able to continue using the allocated wireless channel if the SAS communicates a heartbeat response to the customer premises equipment.

In a CBRS system, the SAS (Spectrum Access System) is used to allocate (authorize/unauthorize) radio resources to CBSDs based on request from CBSD; the spectrum allocation/grant to the CBSD can be in a chunks of 10 MHz or 20 MHz and up to 100 MHz assuming LTE operation.

Environmental monitor sensors are used in SAS controlled CBRS network to measure the radar activity in the CBRS band. For example, sensors placed on the East coast and West coast are used to detect radar signals in 3.5 GHz CBRS band. When a signal is detected in the CBRS band, the ESC sensor notifies a spectrum access system that all nearby CBSD should power down and not transmit any signal in the CBRS band to reduce interference caused by those CBSDs.

According to conventional techniques, the allocation management resource has full control of the CBSDs. However, the SAS does not have any control over RF repeater which repeat the signals in 5G network.

BRIEF DESCRIPTION OF EMBODIMENTS

Embodiments herein provide novel ways of improving wireless communications to one or more communication devices in a network environment.

More specifically, in one embodiment, a communication system includes a wireless base station and one or more repeater wireless stations. A first repeater wireless station in the network environment receives a first wireless signal from the wireless base station. The first repeater wireless station reproduces the first wireless signal as a second wireless signal. The first repeater wireless station controls a phase shift of the second wireless signal with respect to timing of the first wireless signal to reduce wireless interference in the network environment.

In further example embodiments, the repeater wireless station is further operative to: phase shift the second wireless signal with respect to the received first wireless signal in response to a notification from the wireless base station or other suitable entity. In one embodiment, the first repeater wireless station receives the notification in response to a sensor in the network environment detecting the wireless interference above a threshold level. The wireless interference is caused by the first wireless signal. The first repeater wireless station transmits the second wireless signal in a same or similar direction as the first wireless station. Generation and transmission of the second wireless signal (such as phase shifted first wireless signal) reduces wireless interference in the network environment caused by the first wireless signal.

Thus, in example embodiments, wireless interference is caused by the first wireless signal. The phase-shifted second wireless signal frequency manager resource the repeater wireless station at least partially cancels the wireless interference caused by the first wireless signal.

Still further embodiments herein include, via the repeater wireless station or other suitable entity, varying a magnitude of a phase shift between the second wireless signal and the first wireless signal. In one embodiment, the phase shift is between 170 and 190 degrees, although the phase shift can be any suitable value outside this range.

The wireless base station and the repeater wireless station as discussed herein can be configured to communicate over any suitable wireless channel and/or wireless communication protocol. For example, in one embodiment, the first repeater wireless station and or corresponding wireless base station are registered with an allocation management resource such as a Spectrum Access System. The allocation management resource allocates one or more wireless channels in which to transmit the first wireless signal and the second wireless signal.

In accordance with further example embodiments, a communication management resource associated with the first repeater wireless station or other suitable entity is operative to identify a phase of the received first wireless signal. The communication management resource uses the identified phase as a basis to adjust the phase of the second wireless signal during subsequent transmission from the repeater wireless station to a communication device or other suitable entity.

In accordance with more specific embodiments, the communication method according to embodiments herein includes the following operations.

1. The wireless base station turns on and connects with the channel allocation management resource (such as spectrum access system).

2. The allocation management resource (SAS) grants spectrum such as one or more wireless channels to the wireless base station and a repeater wireless station.

3. The allocation management resource knows the location of each repeater wireless station in the network environment.

4. Wireless signal sensors (such as ESC or Environmental Sensing Capability) at different locations in the network environment constantly measure the wireless signal power present in the CBRS (Citizens Band Radio Service) band.

5. A first repeater wireless station (such as RF repeater) connects to wireless base station and reports its location to the wireless base station. Alternatively, the wireless base station communicates with an entity that provides location information indicating a location of the repeater wireless station. In one embodiment, the wireless base station determines that the repeater wireless station is connected to itself via receipt of information such as 'UE category' information reported by the repeater wireless station to the wireless base station.

6. The allocation management resource tracks the location of each wireless sensor (ESC sensor) present in the network environment.

7. When the wireless sensor detects signal in the CBRS band, it sends notification to the allocation management resource with its identity information (such as ESC IDENTIFIER).

The allocation management resource receives notification of a wireless signal from the ESC location where the interfering wireless signal is detected.

The allocation management resource notifies each wireless base station (CBSD) in the network environment to power down or reduce power.

A. Rather than completely power down, the wireless base station partially powers down its wireless transmit power level (any suitable amount such as 3 dB, 2 dB, 1 dB, etc.) when transmitting wireless communications in the network environment.

B. The repeater wireless station receives a wireless signal transmitted by the wireless base station.

C. To reduce wireless interference, the repeater wireless station (RF repeater) calculates or determines the phase of wireless signal received from the wireless base station.

D. The repeater wireless station (RF repeater) creates a signal with an N-degree phase shift (such as where N=180 degrees or other suitable value) with respect to the received wireless signal from the base station.

E. The repeater wireless station (RF repeater) transmits the phase shifted signal (replica or reproduction of the received wireless signal from the wireless base station) towards ESC sensor location. The phase-shifted signal generated by the repeater wireless station cancels the interference caused by the original wireless signal transmitted by the wireless base station at the wireless sensor (ESC sensor) because both signals travel in the same direction toward the wireless sensor.

F. If the wireless base station still receives one or more additional 'power down' messages from the allocation management resource indicating continued interference, embodiments herein include repeating operations A-E.

Embodiments herein are useful over conventional techniques. For example, embodiments herein include unique ways of providing reduced interference via phase shifted wireless signals transmitted from one or more repeater wireless stations.

Note further that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications and handoffs in a network environment. The instructions, when executed by computer processor hardware, cause the computer processor hardware (such as one or more co-located or disparately processor devices or hardware) to: receive a first wireless signal from a wireless base station; transmit a second wireless signal from the repeater wireless station, the second wireless signal being a reproduction of the first wireless signal; and wherein a phase shift of the second wireless signal is controlled in time with respect to the first wireless signal via the communication processor hardware to reduce wireless interference in the network environment.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
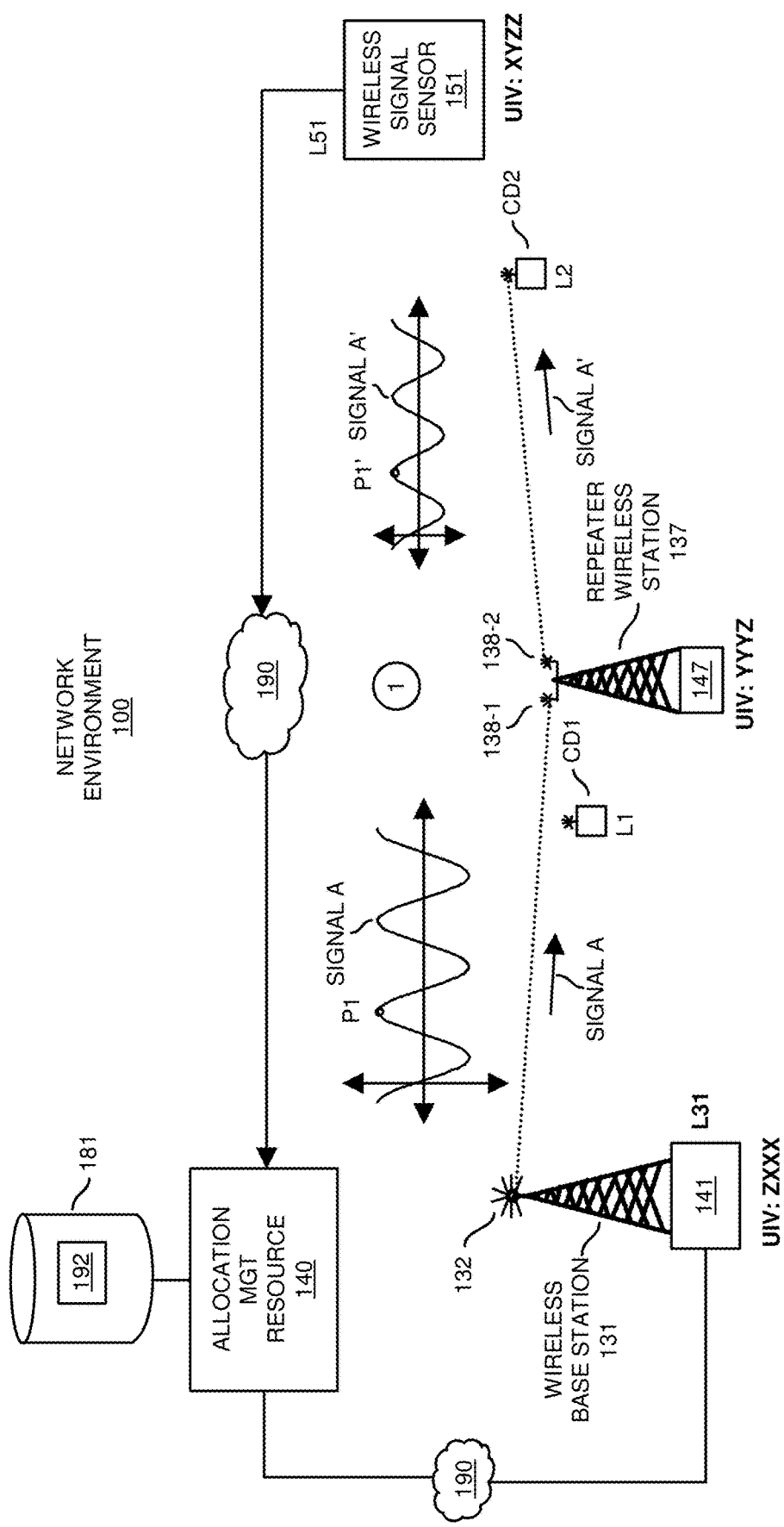
FIG. 1 is an example diagram illustrating a communication network environment and multiple wireless stations (such as a wireless base station and a repeater wireless station) implementing communications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As further discussed herein, a communication system includes a wireless base station and one or more repeater wireless stations. A first repeater wireless station in the network environment receives a first wireless signal from a wireless base station. The first repeater wireless station reproduces the first wireless signal as a second wireless signal. The first repeater wireless station controls a phase shift of the second wireless signal with respect to the received first wireless signal to reduce wireless interference in the network environment.

Now, more specifically, with reference to the drawings, FIG. 1 is an example diagram illustrating a communication network environment and multiple wireless base stations implementing communications according to embodiments herein.

As shown, network environment 100 includes allocation management resource 140 (such as spectrum access system), repository 181, wireless base station 131, repeater wireless station 137, and wireless signal sensor 151.

Wireless network environment 100 includes any number of wireless base stations and corresponding power management resources. In this example embodiment, wireless base station 131 includes communication management resource 141 to manage transmission/reception of wireless communications in the network environment 100. Repeater wireless station 137 implements communication management resource 147 to manage transmission/reception of wireless communications associated with the repeater wireless station 137.

Each of the wireless base stations in network environment 100 includes respective one or more instances of antenna hardware to wirelessly communicate with mobile communication devices (a.k.a., user equipment) and/or other wireless stations such as repeater wireless stations.

For example, in this embodiment, the wireless base station 131 includes antenna hardware 132 (such as one or more antenna elements) to transmit wireless signal A. Repeater wireless station 137 includes antenna hardware such as first antenna hardware 138-1 to receive the wireless signal A and second antenna hardware 138-2 to communicate (transmit) wireless signal A'.

Note that each of the wireless base station 131 and repeater wireless station 137 can be configured to support beamforming and directivity of respective wireless signals (such as signal A, signal A', etc.). Alternatively, the antenna hardware 132/138 associated with the wireless base station 131 and the repeater wireless station 137 support omni-directional communications in the wireless network environment 100.

Note further that each of the resources in network environment 100 can be configured to include or be configured as appropriate hardware, software, or combination of hardware and software to carry out respective operations as discussed herein.

More specifically, the wireless base station 131 as described herein can be implemented via respective wireless base station hardware, wireless base station software, or a combination of wireless base station hardware and wireless base station software; the communication management resource 141 can be implemented as communication management hardware, communication management software, or a combination of communication management hardware and communication management software; the repeater wireless station 137 as described herein can be implemented via respective repeater wireless station hardware, repeater wireless station software, or a combination of repeater wireless station hardware and repeater wireless station software; the communication management resource 147 can be implemented as communication management hardware, communication management software, or a combination of communication management hardware and communication management software; the wireless signal sensor 151 can be implemented via wireless signal sensor hardware, wireless signal sensor management software, or a combination of wireless signal sensor hardware and wireless signal sensor software; and so on.

As further shown in this example embodiment, the network 190 provides connectivity (such as shared communication link, cable, physical link, wireless link, etc.) between resources such as wireless signal sensor 151 and allocation management resource 140 as well as connectivity between allocation management resource 140 and the wireless base station 131.

Communication management resource 141 (such as circuitry, multiple semiconductor chips, processors, drivers, logic, etc.) associated with the wireless base station 131 controls transmission and reception of wireless communications from/to the antenna hardware antenna hardware 132.

Communication management resource 147 (such as circuitry, multiple semiconductor chips, logic, etc.) controls transmission and reception of wireless communications from/to the antenna hardware antenna hardware 138.

Initially, the wireless base station 131 registers with the allocation management resource 140 for allocation of one or more wireless channels.

In further example embodiments, the wireless base station 131 detects or knows of presence of repeater wireless station 137 and communicates such information to the allocation management resource 140.

For example, the repeater wireless station 137 (such as RF repeater) can be configured to wirelessly connect to wireless base station 131 and report its location to the wireless base station 131. Alternatively, the wireless base station 131 communicates with an entity that provides location information indicating a location of the repeater wireless station 137. In further example embodiments, the wireless base station 131 determines that the repeater wireless station 137 is connected to itself via receipt of information such as 'UE category' and/or identity information reported by the repeater wireless station 137 to the wireless base station 131.

Subsequent to registration, the allocation management resource 140 (such as a spectrum access system) grants spectrum (such as one or more wireless channels) to the wireless base station 131 and repeater wireless station 137. In one embodiment, the allocation management resource 140 allocates wireless channels from a CBRS band. Details of the allocated one or more wireless channels are discussed with respect to FIG. 8 and corresponding text.

The allocated wireless channels are subject to revocation by the allocation management resource 140 in response to detecting wireless interference at the wireless signal sensor 151 above a threshold level.

Referring again to FIG. 1, via data 192 stored in repository 181, the allocation management resource 140 keeps track of the location of each wireless station in the network environment 100 such as location (L37) of the repeater wireless station 137 and location (L31) of the wireless base station 131.

In further example embodiments, the allocation management resource 141 also tracks the location of each wireless signal sensor 151 (such as ESC sensor or other suitable entity) present in the wireless network environment 100. In such an instance, when wireless interference is detected by the wireless signal sensor 151 at the location L51, the allocation management resource 140 is able to identify which of the wireless stations is causing the wireless interference.

Note further that the wireless base station 131 and the repeater wireless station 137 as well as any other wireless stations in the network environment 100 can be configured to communicate over any suitable type of wireless channel and/or wireless communication protocol (cellular wireless communication protocol, Wi-Fi™, etc.).

Further in this example embodiment, subsequent to allocation of a respective wireless channel, assume that the wireless base station 131 communicates signal A (such as a downlink signal) from antenna hardware 132 in the wireless network environment 100. The wireless signal A includes data directed to one or more mobile communication devices such as user equipment CD1, user equipment CD2, etc.

Assume that the wireless base station 131 transmits signal A to the communication device CD2. A magnitude of the signal A attenuates as it travels further from the wireless base station 131. The signal A may be so attenuated by the time it is received by the communication device CD2.

As further shown, in operation #1, to provide better wireless coverage and connectivity to devices in the network environment 100, the repeater wireless station 137 and corresponding communication management resource 147 are configured to receive the wireless signal A (modulated carrier frequency allocated by the allocation management resource 140) on antenna hardware 138-1 and then retransmit the signal A as signal A' (modulated carrier frequency allocated by the allocation management resource 140) to the user equipment CD2 via antenna hardware 138-2.

In this example embodiment, the transmission of wireless signal A' is slightly delayed with respect to the original wireless signal A. In such an instance, if the delay is very small or negligible, the magnitude of the wireless signal A' itself or a combination of the signal A and A' may result in wireless interference sensed by the wireless signal sensor 151.

For example, in one embodiment, the wireless signal sensor (such as ESC or Environmental Sensing Capability) continuously measures the wireless signal power present in a spectrum (wireless channel carrying signal A) used by the wireless base station 131 and repeater wireless station 137 such as the CBRS (Citizens Band Radio Service) band. An example of monitoring received wireless signals is further discussed in FIG. 2.

Figure 2:
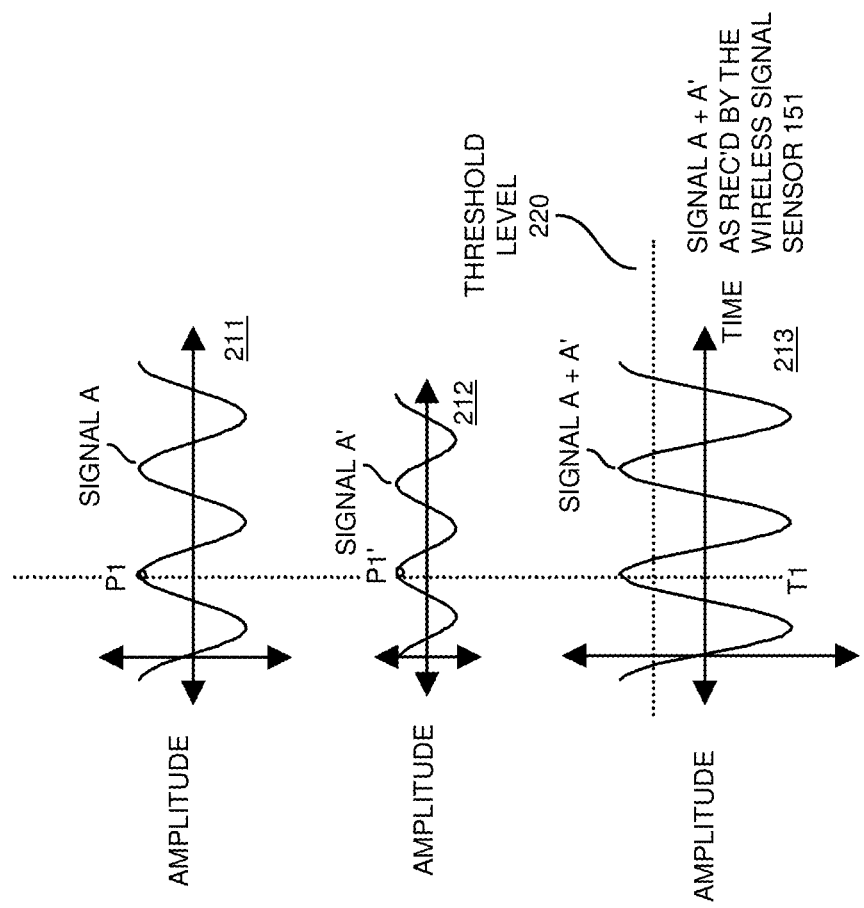
FIG. 2 is an example diagram illustrating detected signal interference according to embodiments herein.

FIG. 2 is an example diagram illustrating detected signal interference according to embodiments herein.

As previously discussed, the wireless signal sensor 151 monitors for the presence of wireless signals in the one or more wireless channel allocated for use by the wireless base station 131 and the repeater wireless station 137 to support communications with the communication devices CD1, CD2, etc.

In one embodiment, as previously discussed, the repeater wireless station 137 receives the signal A on antenna hardware 138-1 as shown in graph 211.

The repeater wireless station 137 replicates the received signal A as signal A' (see graph 212) and transmits in a direction to the communication device CD2. Thus, as previously discussed, the antenna hardware 138-2 of repeater wireless station 137 retransmits the received wireless signal A as signal A'.

In one embodiment, the phase difference between the received wireless signal 131 and the transmitted wireless signal A' is very small such that the signal A and signal A' align in phase as shown in graphs 211 and 212.

As previously discussed, the communication device CD2 receives both attenuated signal A and attenuated signal A'. As shown in graph 213, the signal A and signal A' constructively add with each other to produce signal A+A' received by the communication device CD2 and/or wireless signal sensor 151.

The wireless signal sensor 151 compares the received wireless signal A+A' to threshold level 220. In one embodiment, the threshold level 220 represents an interference threshold value.

In further example embodiments, in response to detecting a condition in which the received signal A+A' is greater than the threshold level 210, the wireless signal sensor 151 transmits respective notification to the allocation management resource indicating the condition. This is further shown in FIG. 3.

Figure 3:
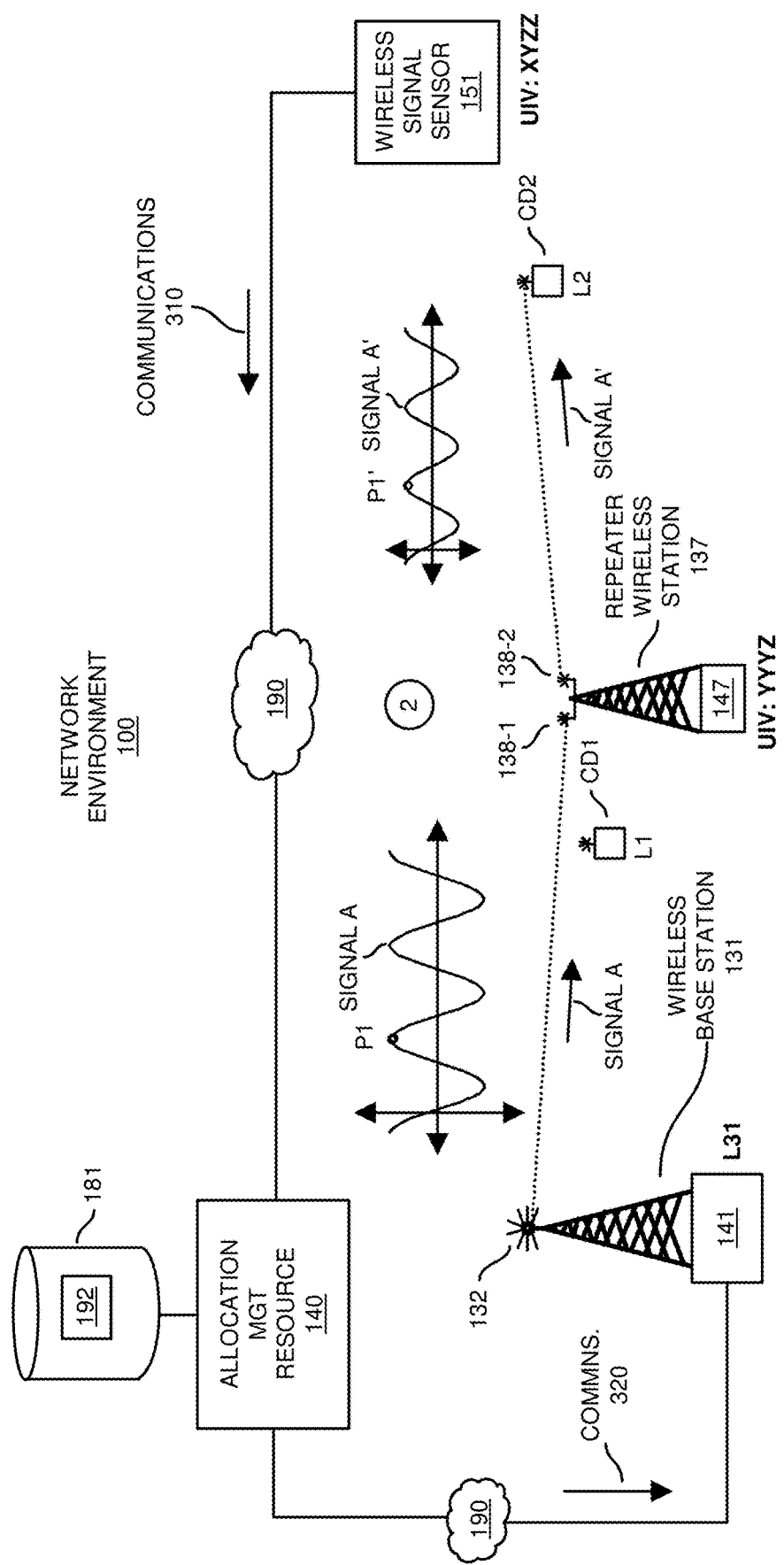
FIG. 3 is an example diagram illustrating notification to a wireless base station to reduce power in response to detecting wireless interference according to embodiments herein.

FIG. 3 is an example diagram illustrating power reduction in response to detecting wireless interference according to embodiments herein.

In operation #2, the wireless signal sensor 151 transmits communications 310 over network 190 to the allocation management resource 140 indicating that the magnitude of wireless energy associated with signal A+A' (as received by the wireless signal sensor 151) is above a respective interference threshold level 210.

In response to this interference condition, the allocation management resource 140 transmits communications 320 over the network to the wireless station 131 and corresponding communication management resource 141. In one embodiment, the communications 320 notify the wireless base station 131 of the occurrence of interference above the threshold level 210 as detected by the wireless signal sensor 151.

In one embodiment, the communications 320 from the allocation management resource 140 notify the wireless base station 131 and corresponding communication management resource 141 to reduce the magnitude of transmitting signal A and or signal A' such that the wireless signal A or signal A+A' is below the threshold level 210.

Figure 4:
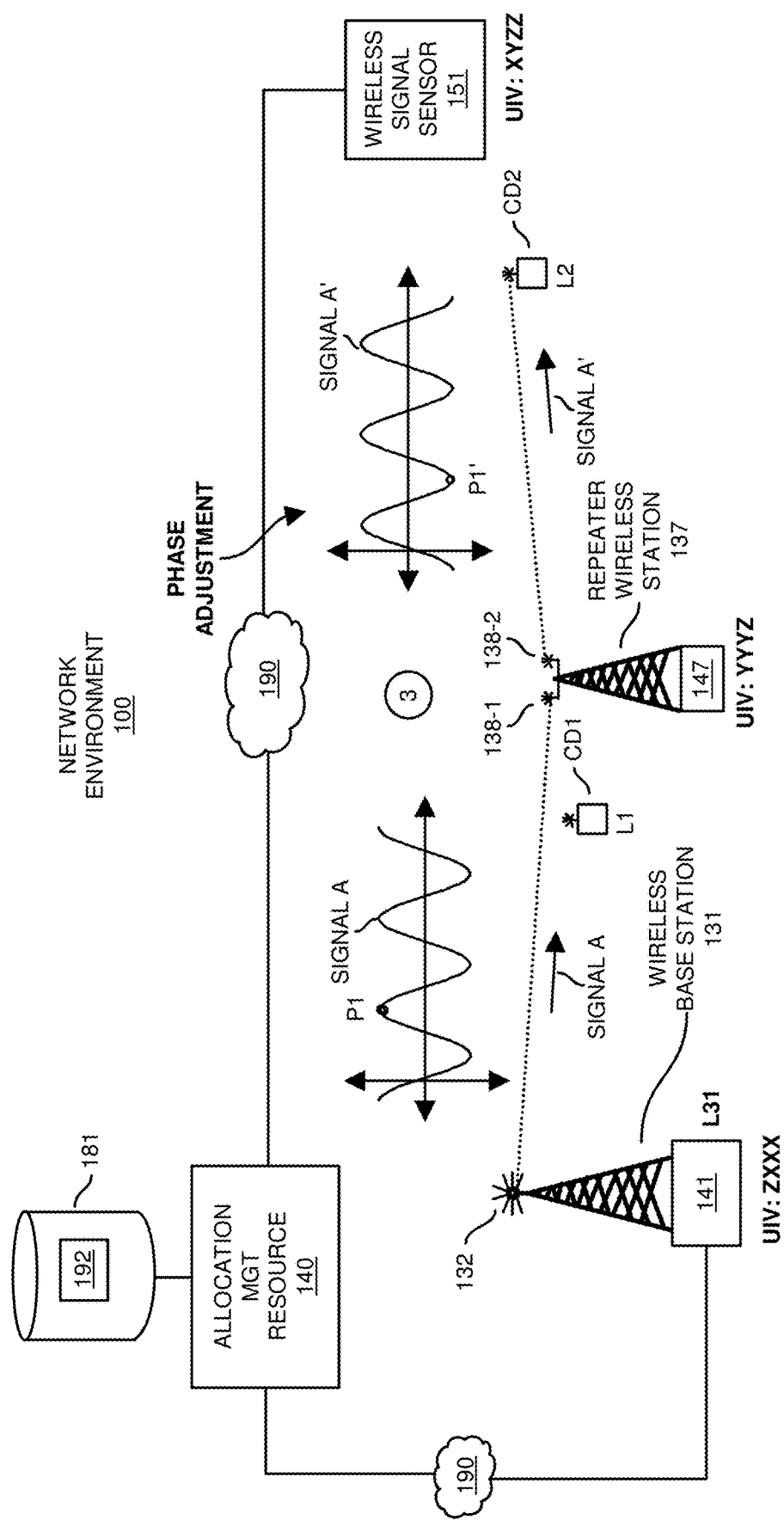
FIG. 4 is an example diagram illustrating phase adjustment of one or more wireless signals to reduce interference according to embodiments herein.

FIG. 4 is an example diagram illustrating phase adjustment of one or more wireless signals to reduce interference according to embodiments herein.

In this example embodiment, in response to receiving the notification indicating that the signal A+A' as received by the wireless signal sensor 151 is above a threshold level 210, the wireless base station 131 transmits control communications 410 to the repeater wireless station 137. In one embodiment, the communications 410 notify the repeater wireless station 137 corresponding communication management resource 147 to adjust a respective phase of retransmitting the received signal A.

More specifically, assume in operation #3 that the repeater wireless station 137 corresponding communication management resource 147 are informed as to adjust the phase of retransmitting signal A. In such an instance, in response to the command, the repeater wireless station 137 receives a wireless signal A from wireless base station 131. The repeater wireless station 137 reproduces the wireless signal A as a second wireless signal A'. The repeater wireless station 137 and corresponding communication management resource 147 control a phase shift of the second wireless signal A with respect to the first wireless signal A as received from the wireless base station 131 to reduce wireless interference in the network environment.

More specifically, the repeater wireless station 137 phase shifts the second wireless signal A' with respect to the received first wireless signal A in response to a notification (such as via communications 410) from the wireless base station 131 or other suitable entity.

Thus, in one embodiment, the repeater wireless station 137 receives the interference notification in response to a wireless signal sensor 151 in the network environment 100 detecting the wireless interference awe signal A+A' above a threshold level 210.

In one embodiment, the repeater wireless station 137 transmits at least a portion of the second wireless signal A' in a same or similar direction as the first wireless signal A transmitted from the wireless base station 131. In such an instance, the wireless signal sensor 151 receives the signal A from wireless base station 131; the wireless signal sensor 152 receives the signal A' from the repeater wireless station 137. However, because the wireless signal A' is phase shifted with respect to the wireless signal A, generation and transmission of the second wireless signal A' (such as phase shifted first wireless signal) reduces wireless interference in the network environment caused by the wireless signal A. Additional details are shown and discussed with respect to FIG. 5.

Figure 5:
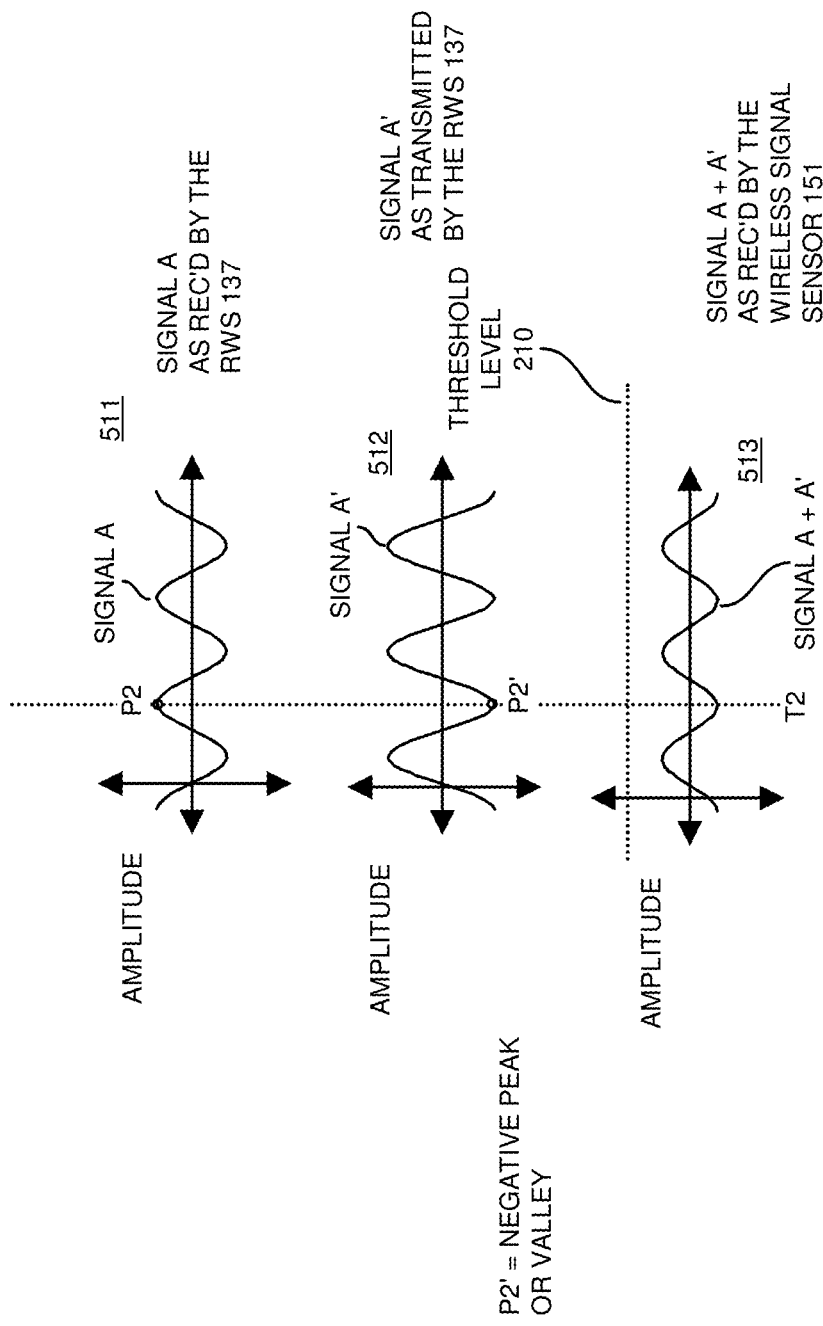
FIG. 5 is an example diagram illustrating reduced interference as a result of phase adjustments according to embodiments herein.

FIG. 5 is an example diagram illustrating reduced interference as a result of phase adjustments according to embodiments herein.

In accordance with further example embodiments, the communication management resource 147 associated with the repeater wireless station 137 monitors and identifies a phase of the received wireless signal A. In one embodiment, the communication management resource 141 detects the peak P2 (or particular portion of the signal) associated with wireless signal A occurring at a particular time such as time T2. The communication management resource uses the identified phase associated with peak P2 to adjust the phase of the second wireless signal A'. For example, the communication management resource 147 reproduces the wireless signal A' by shifting the received wireless signal A by 180 degrees or other suitable value. In such an instance, the peak P2 becomes a valley P2' associated with the signal A'.

Note that any suitable circuitry can be used to implement a respective phase shift of the wireless signal A into the wireless signal A'.

Further in this example embodiment, the phase-shifted wireless signal A' at least partially cancels the wireless interference caused by the wireless signal A from the wireless base station 131.

Note further that the magnitude of the phase shift implemented by the communication management resource 147 may vary over time. Accordingly, embodiments herein include, via the repeater wireless station 137 or other suitable entity, varying a magnitude of a phase shift between the second wireless signal A' and the first wireless signal A. In one embodiment, the phase shift associated with generation of the wireless signal A' is between 170 and 190 degrees, although the phase shift can be any suitable value outside this range.

With further reference to FIG. 5, the repeater wireless station 137 receives the signal A on antenna hardware 138-1 as shown in graph 511.

The repeater wireless station 137 replicates the received signal A as signal A' (see graph 512) and transmits it in a direction to the communication device CD2 in a vicinity of the wireless signal sensor 151. Thus, as previously discussed, the antenna hardware 138-2 of repeater wireless station 137 retransmits the received wireless signal A as signal A' in the same direction as signal A.

In one embodiment, the phase difference between the received wireless signal 131 and the transmitted wireless signal A' is around 180 degrees such that the signal A and signal A' align in phase as shown in graphs 511 and 512.

Further, as previously discussed, the communication device CD2 receives both attenuated signal A and attenuated signal A'. As shown in graph 513, the signal A and signal A' constructively cancel with each other to produce signal A+A' received by the communication device CD2 and/or wireless signal sensor 151.

The wireless signal sensor 151 compares the received wireless signal A+A' to threshold level 220. In one embodiment, as previously discussed, the threshold level 220 represents an interference threshold value.

In further example embodiments, in response to detecting a condition in which the received signal A+A' is less than the threshold level 210, the wireless signal sensor 151 transmits a respective notification to the allocation management resource 140 indicating the respective condition that the wireless power level detected by the wireless signal sensor 151 is below a respective threshold level 210.

In still further example embodiments, the wireless base station 131 can be configured to receive feedback commands from the allocation management resource 140 indicating whether the transmitted wireless signal A or combination of wireless signal A+A' is above the threshold level 210. Each time the wireless base station 131 receives notification that the received signal level by the wireless signal sensor 151 is above the threshold level 210, the wireless base station 131 reduces the total power of the wireless signal received by the wireless signal sensor 151. This can include one or more of: reducing a respective wireless power level of transmitting communications from wireless base station 131, reducing a respective wireless power level of transmitting communications from repeater wireless station 137, adjusting a phase of the wireless signal retransmitted by the repeater wireless station 137, reducing a power level of the repeater wireless station 137 retransmitted the signal A, and so on. The reduction in power can occur in a stepwise manner until the wireless signal sensor 151 provides feedback that the wireless power level of communications received in the wireless channel #1 used by the wireless base station 131 and the repeater wireless station 137 is below the threshold level 210.

Figure 6:
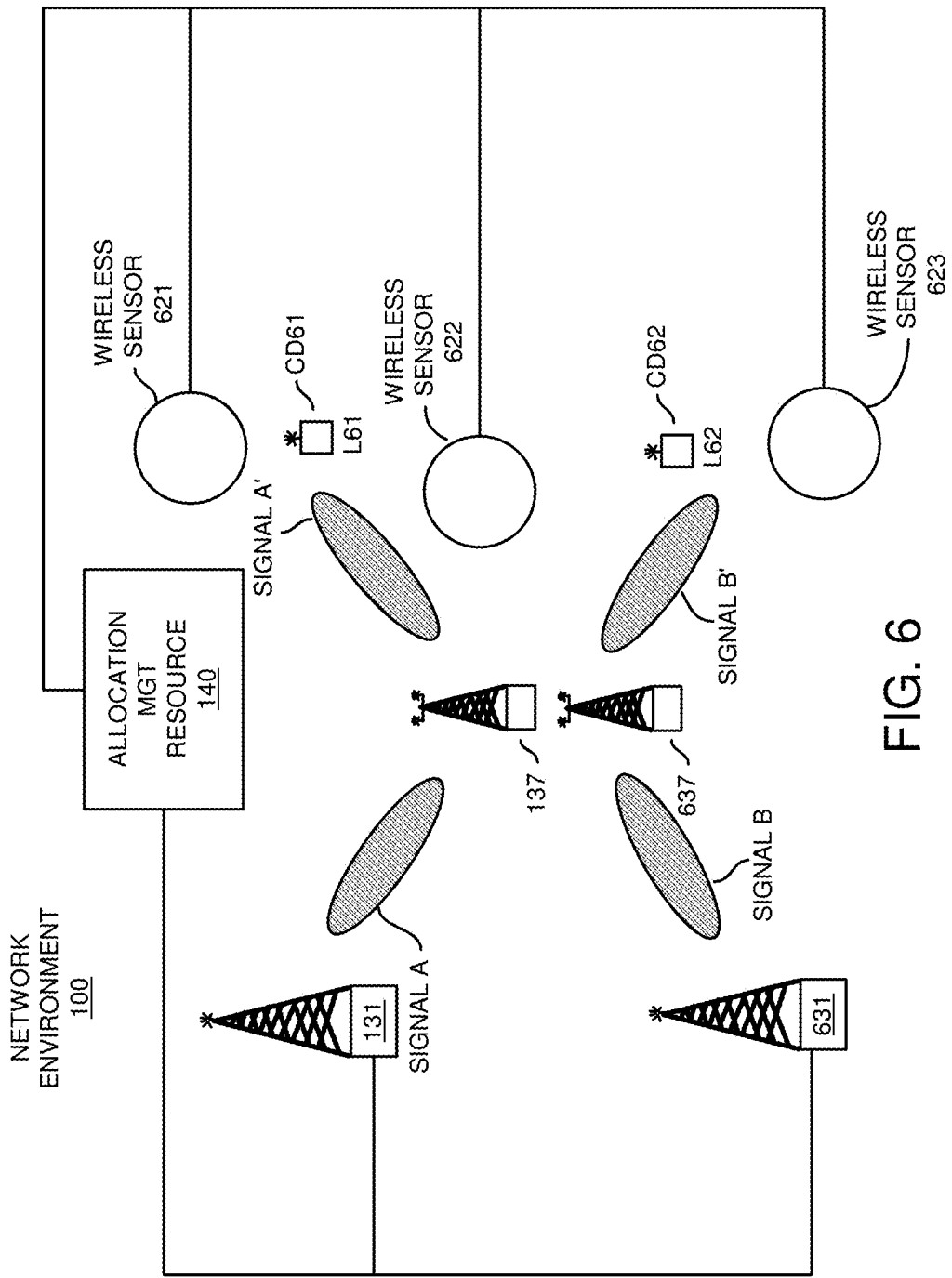
FIG. 6 is an example diagram illustrating network environment including multiple wireless stations supporting wireless connectivity according to embodiments herein.

FIG. 6 is an example diagram illustrating network environment including multiple wireless stations supporting wireless connectivity according to embodiments herein.

In this example embodiment, the network environment 100 includes multiple wireless stations such as wireless base station 131, wireless base station 631, etc.

Via signal A, the wireless base station 131 communicates with repeater wireless station 137; repeater wireless station 137 repeats the received signal A as signal A' (potentially phase adjusted) to provide communications to a respective communication device such as communication device CD61.

Via signal B, the wireless base station 131 communicates signal B to repeater wireless station 637; repeater wireless station 637 repeats the received signal B as signal B to provide communications to a respective communication device such as communication device CD62.

Example network environment 100 in FIG. 6 further includes multiple wireless sensors such as wireless sensor 621, wireless sensor 622, wireless sensor 623, etc. In a similar manner as previously discussed, the wireless sensors monitor a level of wireless communications in the network environment 100 and provide feedback to the allocation management resource 140. Allocation management resource 140 controls use of the allocated wireless channels and corresponding power level implemented by the wireless base stations and repeater wireless stations.

Figure 7:
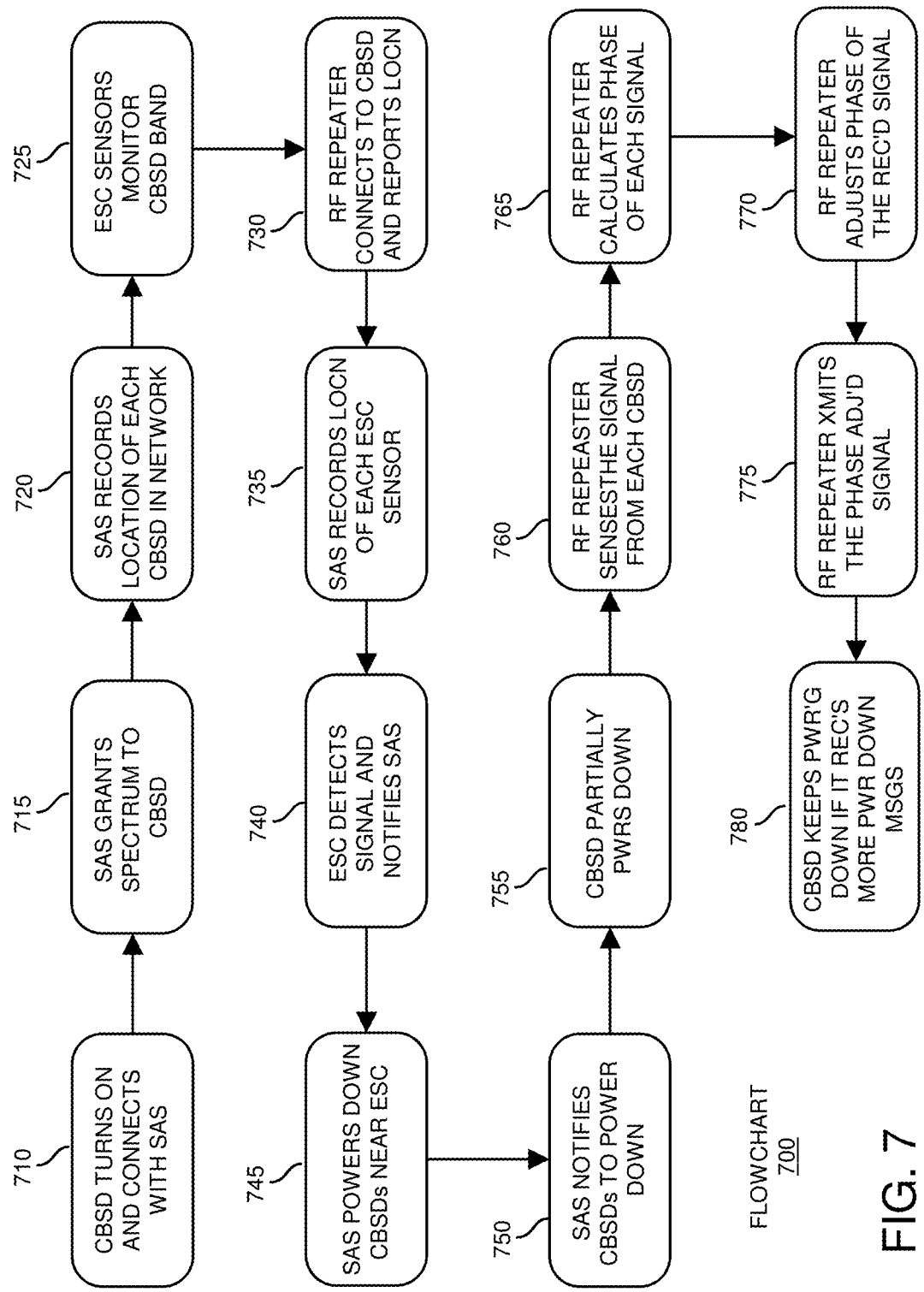
FIG. 7 is an example diagram illustrating operations associated with reducing wireless interference in a network environment according to embodiments herein.

FIG. 7 is an example diagram illustrating operations associated with reducing wireless interference in a network environment according to embodiments herein.

In processing operation 710, the wireless base station 131 turns on and connects with the channel allocation management resource 140 (such as a spectrum access system).

In processing operation 715, the allocation management resource 141 (spectrum access system SAS) grants spectrum (such as one or more wireless channels) to the wireless base station 131 and repeater wireless station 137.

In processing operation 720, the allocation management resource 141 tracks the location of each repeater wireless station in the wireless network environment 100.

In processing operation 725, the wireless signal sensors (such as ESC or Environmental Sensing Capability) continuously measure the wireless signal power present in a spectrum such as the CBRS (Citizens Band Radio Service) band as used by the wireless base station 131 and repeater wireless stations to support wireless connectivity.

In processing operation 730, the repeater wireless station 137 (such as RF repeater) connects to wireless base station 137 and reports its location to the wireless base station 131. Alternatively, the wireless base station 131 communicates with an entity that provides location information indicating a location of the repeater wireless station 137. The wireless base station 131 determines that the repeater wireless station 137 is connected to itself via receipt of information such as 'UE category' and/or identity information reported by the repeater wireless station 137 to the wireless base station 131.

In processing operation 735, the allocation management resource 141 tracks the location of each wireless signal sensor 151 (such as ESC sensor or other suitable entity) present in the wireless network environment 100.

In processing operation 740, when the wireless signal sensor 151 detects presence of the signal A in the monitored wireless band above a respective threshold level 210, the wireless signal sensor 151 transmits a notification to the allocation management resource 141 with its identity information (such as ESC IDENTIFIER) as well as notification of the detected event of wireless interference caused by signal A (such as in channel #1 allocated to the wireless base station 131 and the repeater wireless station 137). In one embodiment, the wireless signal sensor 151 notifies the allocation management resource 141 of the frequency of the wireless channel (such as wireless channel #1) in which interference is detected as well as location of the wireless signal sensor 151. The allocation management resource 140 maps the location L51 of the wireless signal sensor 151 to any other nearby wireless base stations or repeater wireless stations that may be causing the respective interference in the network environment 100. In this example embodiment, the allocation management resource 141 determines that the wireless base station 131 and corresponding repeater wireless station 137 are causing the wireless interference is detected by the wireless signal sensor 151 because they are in closest proximity to the wireless signal sensor 151.

In processing operation 745, the allocation management resource 141 receives notification of the detected wireless signal A and location L51 where the interference of wireless signal A and/or wireless signal A' is detected by the wireless signal sensor 151. The allocation management resource 141 notifies the wireless base station 131 of the detected interference associated with signal A and notifies it to power down or at least reduce its respective wireless transmit power level from the wireless base station 131 and/or repeater wireless station 137.

In processing operation 750, the allocation management resource 140 notifies the wireless base station 131 to reduce a wireless transmitter level of communications in the allocated wireless channel #1 (such as carrying wireless signal A, signal A').

In processing operation 755, the wireless base station 131 partially powers down (such as any suitable amount such as 3 dB, 2 dB, 1 dB, etc.) its wireless transmit power level of signal A from wireless base station 131 and/or wireless station A' from repeater wireless station 137.

In processing operation 760, the repeater wireless station 137 receives a wireless signal A transmitted by the wireless base station 131.

In processing operation 765, the repeater wireless station 137 (spectrum access system RF repeater) monitors the phase of the received signal A and determines its phase.

In processing operation 770, the repeater wireless station 137 (RF repeater) creates a signal with an N-degree phase shift (such as where N=180 degrees or other suitable value) with respect to the original phase of the received wireless signal A.

In processing operation 775, the repeater wireless station 137 (RF repeater) transmits the phase shifted signal A' (replica or reproduction of the wireless signal A received from the wireless base station 131) towards ESC sensor location. The phase-shifted signal A' generated by the repeater wireless station 137 cancels or partially cancels the interference caused by the original wireless signal A transmitted by the wireless base station at the wireless sensor (ESC sensor) such that the signal A is no longer causing interference to the wireless signal sensor 151 above the threshold level 210. The user equipment CD2 is still able to receive the signal A to receive downlink communications because the signal A+signal A' is sufficiently high in wireless power.

In processing operation 780, if the wireless signal sensor 151 still detects interference from the combination of signal A and A' even after adjustments by the wireless base station and/or repeater wireless station 137, the wireless signal sensor 151 notifies the allocation management resource 141 that the interference caused by the wireless signal A and/or wireless signal A' is still above the threshold level 210; the allocation management resource 141 notifies the wireless base station 131 of the continued wireless interference. In one embodiment, in a specific implementation, the wireless base station 131 continues to reduce a transmit power level of wireless signal A such that the wireless signal sensor 151 no longer experiences interference caused by the wireless signal A and wireless signal A'. In other words, the wireless base station 131 may receive a first notification indicating to reduce a respective power level associated with the signal A and A'. In such an instance, the wireless base station 131 can be configured to reduce a magnitude of the wireless signal A and/or wireless signal A' by a step amount. If the wireless signal sensor 151 still receives the signal A and/or signal A' above the threshold level 210, the wireless signal sensor 151 notifies the allocation management resource 140 that the magnitude of transmitted signal and channel #1 is still too high. The allocation management resource 140 then notifies the wireless base station 131 to further reduce its respective power level associated with wireless signal A and/or wireless signal A'. Eventually, the wireless signal sensor 151 will detect that the signal A and/or combination of wireless signal A and wireless signal A' is below the threshold of old to hundred 10. At such time, the wireless signal sensor 151 notifies the allocation management resource 140 that the detected power level associated with wireless channel #1 is below the threshold level 210. The allocation management resource 140 no longer needs to notify the wireless base station 131 to reduce its power level or the power level associated with the corresponding repeater wireless station 137.

Figure 8:
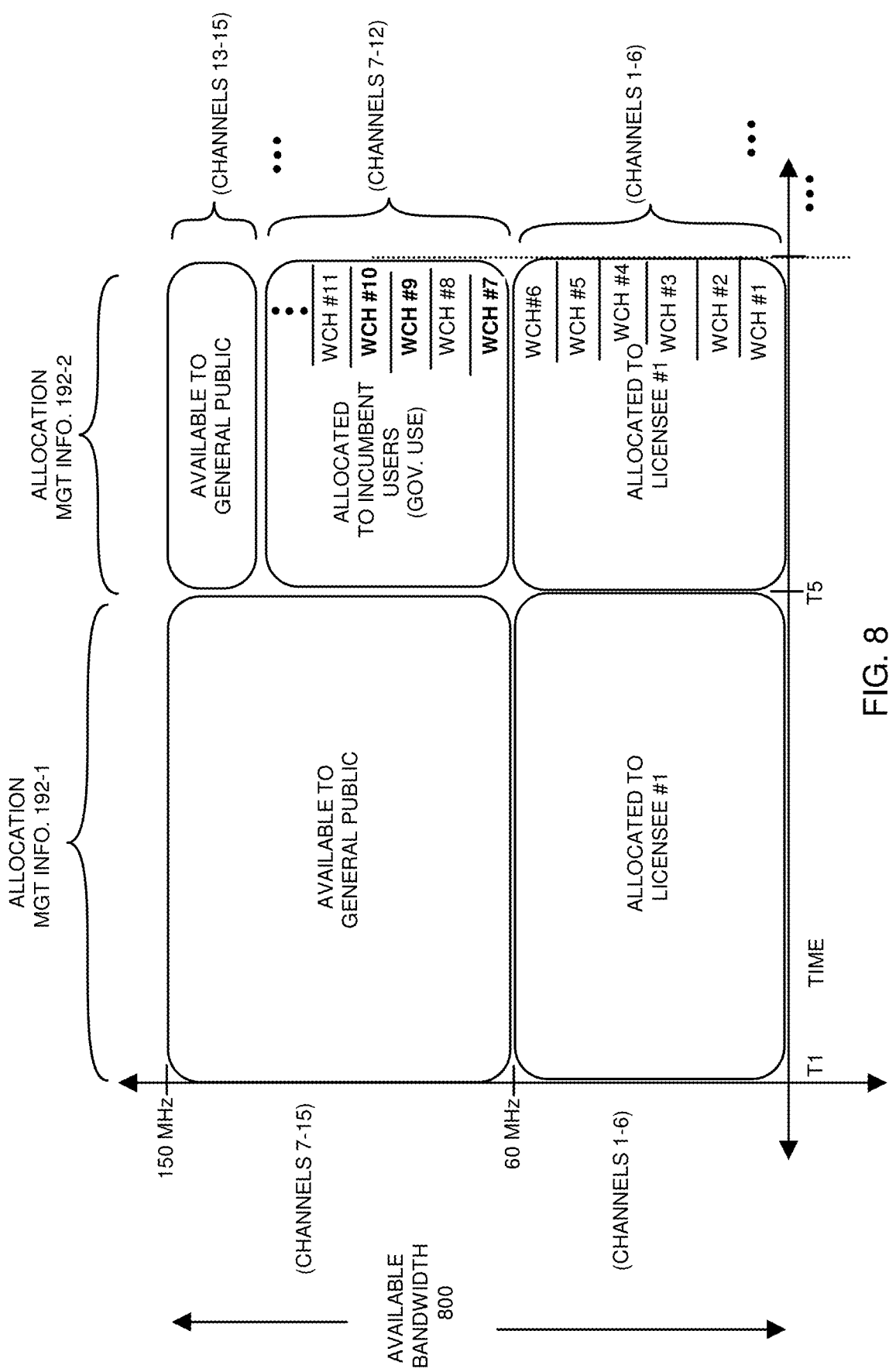
FIG. 8 is an example diagram illustrating a wireless spectrum from which wireless channels are allocated and deallocated according to embodiments herein.

FIG. 8 is an example diagram illustrating generation of dynamic channel allocation information indicating allocation of bandwidth at different tiers of a channel hierarchy according to embodiments herein.

As previously discussed, communication management resource 140 can be configured to allocate any suitable type of wireless spectrum (bandwidth, wireless channels, etc.) for use by the communication devices such as wireless base stations, customer premises equipment, etc., in the network environment 100.

In one non-limiting example embodiment, the communication management resource 140 allocates bandwidth (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, allocation management resource 140 (such as spectrum access system or other suitable entity) keeps track, at any given time, which wireless channels or portions of the multi-tier wireless spectrum or multi-tier radio band (such as CBRS band) are available in the geographical region in which the network environment 100 resides. If government use (such as via a so-called incumbent user) is detected or requested via appropriate input (such as around time T5) to the allocation management resource 140, certain channels (such as those used by the general public) are no longer available for use.

More specifically, in this example, the allocation management information 192-1 (a first instance of allocation management information) indicates that between time T1 and time T5, channels 7-15 are available to the general authorized access users (general public or low priority users) for use; channels 1-6 are available for use by licensee #1. In a manner as previously discussed, these channels are allocated for use by the wireless base stations in network environment 100.

As further shown, at or around time T5, assume that the communication management resource 140 receives input indicating use of a portion (channels 7-12) of the spectrum by an incumbent user such as the government. In such an instance, the allocation management resource 140 updates the channel allocation information such that the allocation management information 192-2 indicates that only channels 13-15 are allocated as being available to the general authorized access users; channels 7-12 are assigned for use by an incumbent entity requesting use or actually using the channels; wireless channels 1-6 are allocated for use by a first licensee. Thus, after time T5, the wireless channels 7-12 are no longer available for use by the lower priority users (i.e., general authorized access users) such as wireless base station 131 or wireless base station 431 (whichever happens to be operating at the time).

In one embodiment, in response to revocation of the allocation of wireless channels 7-12, the communication management resource 140 notifies the wireless base station 131 at or around time T5 that the wireless base station 131 is no longer able to use wireless channel #7, #8, #9, and #10 because these channels have been revoked and assigned for use by the incumbent user.

Thus, between time T1 and time T5, the wireless base station 131 uses the wireless channels #7, #8, #9, #10, etc., to provide wireless service to the communication devices. At or around time T5, the communication management resource 140 deallocates use of the wireless channels #7, #8, #9 and #10 from the wireless base station 131 in favor of use of the wireless channels #7, #8, #9, and #10 being used by or allocated to the incumbent user after time T5.

This illustrates the dynamic availability of different wireless channels bandwidth in a hierarchy as shared in network environment 100. For example, if communication management resource 140 allocates use of wireless channels #7-12 in the hierarchy of available channels to any of one or more base stations, communication devices, etc., then the communication management resource 140 must de-allocate use of such wireless channels during conditions in which a higher priority so-called incumbent user relinquishes use of wireless channels 7-12 at or around time T5. In such an instance, as previously discussed, the communication management resource 140 deallocates the wireless channels 7-12 from respective wireless stations for use instead by the incumbent user (higher priority user).

In this example embodiment as previously discussed, the allocation management resource 140 can be configured to allocate use of wireless channel WCH #1 to wireless base station 131 and the repeater wireless station 137. In response to detecting a condition that a respective one or more incumbent entity uses the respective wireless channels, the allocation management resource 140 communicates with the wireless base stations to revoke use of such wireless channel. If available, the allocation management resource 140 allocates use of different wireless channels to the wireless base stations.

Figure 9:
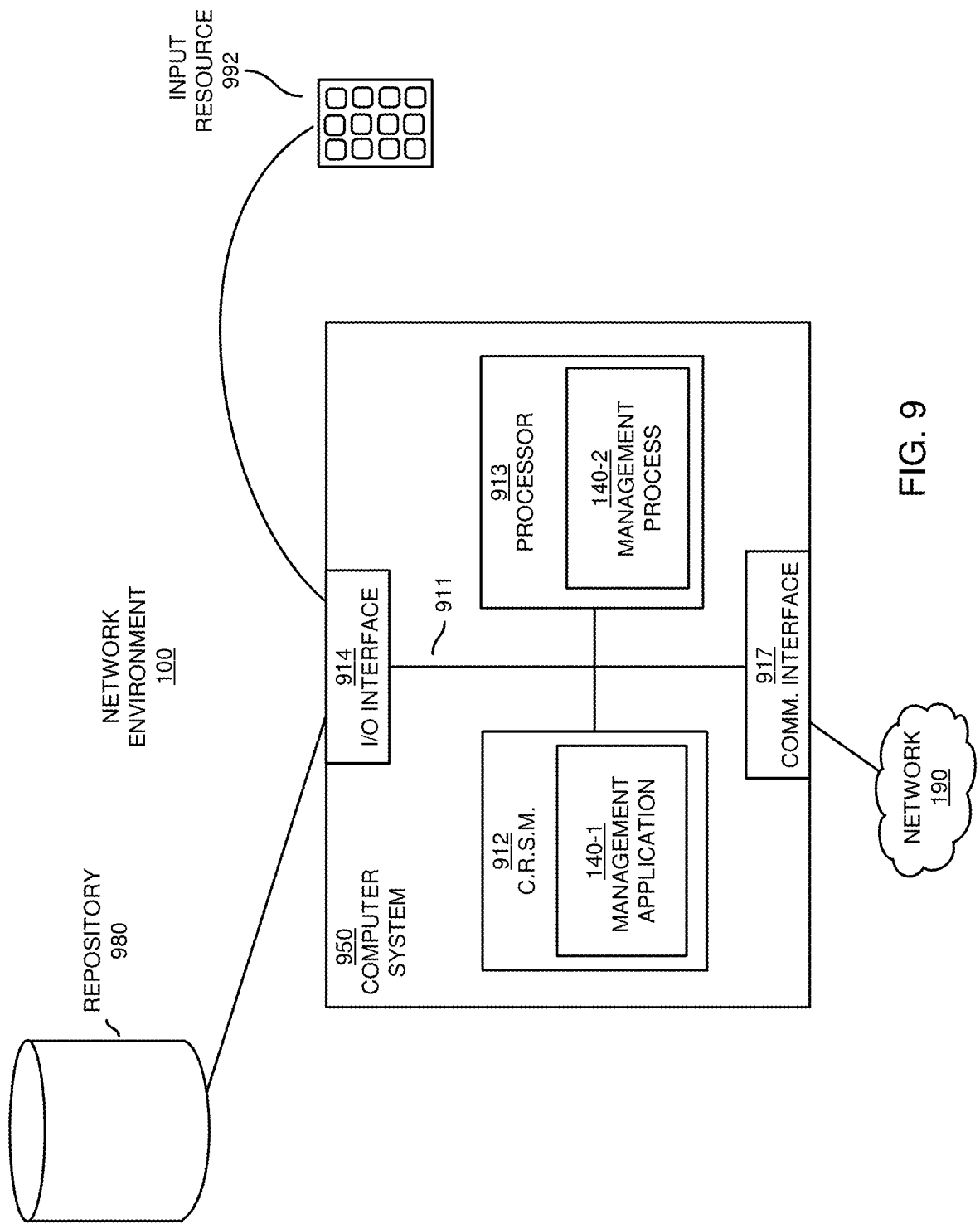
FIG. 9 is an example diagram illustrating example computer architecture operable to execute one or more operations according to embodiments herein.

FIG. 9 is an example block diagram of a computer system for implementing any of the operations as discussed herein according to embodiments herein.

Any of the resources (such as allocation management resource 140, wireless base station 131, communication management resource 141, repeater wireless station 137, communication management resource 147, wireless signal sensor 151, etc.) as discussed herein can be configured to include a respective instantiation of computer processor hardware and corresponding executable instructions to carry out the different operations as discussed herein. For example, communication management resource 940 (such as instantiation of allocation management resource 140, wireless base station 131, communication management resource 141, repeater wireless station 137, communication management resource 147, or wireless signal sensor 151) can be configured to execute the management application 940-1.

As shown, computer system 950 of the present example includes an interconnect 911 that couples computer readable storage media 912 such as a non-transitory type of media (i.e., any type of hardware storage medium) from which digital information is stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 940-1 stored on computer readable storage medium 912. Execution of the management application 940-1 produces management process 940-2 to carry out any of the operations and/or processes as discussed herein.

Those skilled in the art will understand that the computer system 950 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
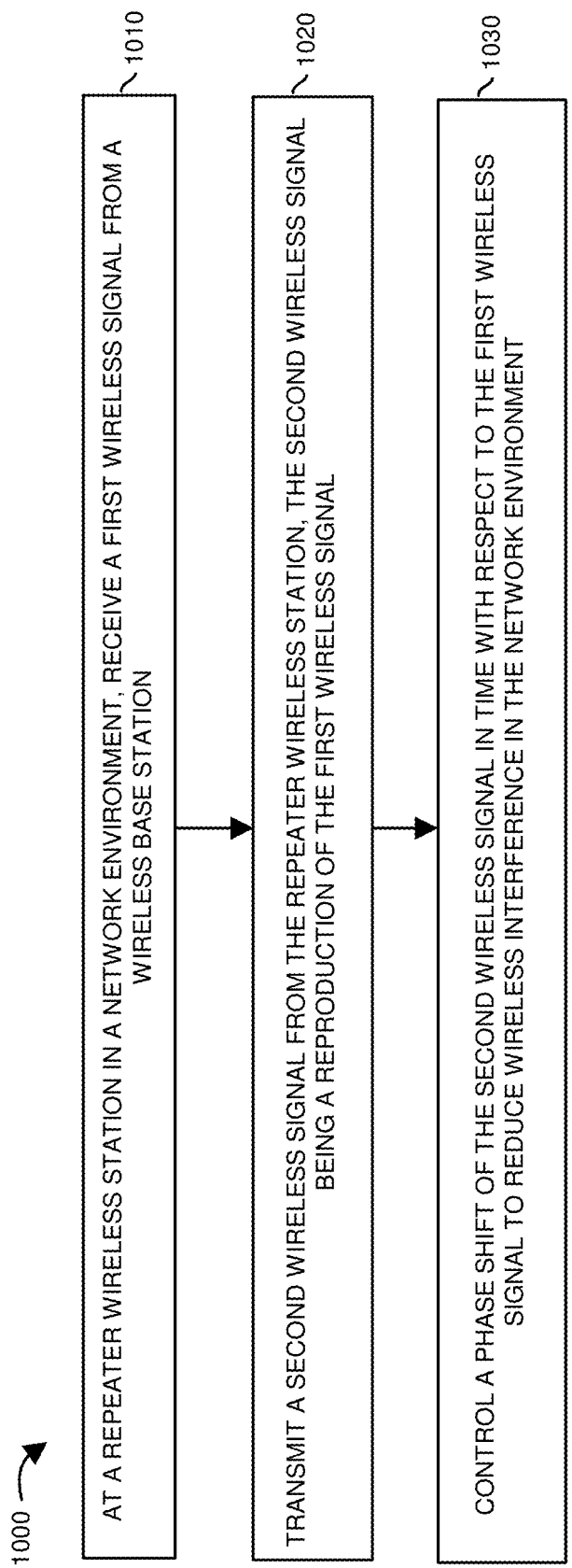
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, a repeater wireless station 137 in network environment 100 receives a first wireless signal A transmitted from wireless base station 131.

In processing operation 1020, the repeater wireless station 137 transmits a second wireless signal A'. In one embodiment, the second wireless signal A' is a reproduction of the first wireless signal A.

In processing operation 1030, the repeater wireless station 137 controls a phase shift of the second wireless signal A' in time with respect to the received first wireless signal A to reduce wireless interference in the network environment 100. As previously discussed, the phase shift more closely aligns the received wireless signal A' (transmitted from repeater wireless station 137) with the signal A (transmitted from wireless base station 131).

Note again that techniques herein are well suited to reduce interference in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
at a repeater wireless station in a network environment, receiving a first wireless signal from a wireless base station;
transmitting a second wireless signal from the repeater wireless station, the second wireless signal being a reproduction of the first wireless signal; and
wherein the second wireless signal is phase-shifted in time with respect to the first wireless signal in response to receiving a notification from the wireless base station, the second wireless signal phase shifted with respect to the first wireless signal to reduce wireless interference in the network environment.

2. The method as in claim 1 further comprising:
receiving the notification in response to a sensor detecting the wireless interference in the network environment above a threshold level, the wireless interference caused by the first wireless signal.

3. The method as in claim 1, wherein the wireless interference is caused by the first wireless signal transmitted from the wireless base station.

4. The method as in claim 1, wherein the wireless interference is caused by the first wireless signal; and
wherein the phase shifted second wireless signal at least partially cancels the wireless interference caused by the first wireless signal.

5. The method as in claim 1, wherein phase shifting the second wireless signal in time with respect to the first wireless signal includes:
varying a magnitude of a phase shift between the second wireless signal and the first wireless signal.

6. The method as in claim 1 further comprising:
registering the wireless base station with an allocation management resource for allocation of a wireless channel in which to transmit the first wireless signal.

7. The method as in claim 1, wherein a phase shift of the second wireless signal with respect to the first wireless signal is between 170 and 190 degrees.

8. The method as in claim 1 further comprising:
identifying a phase of the received first wireless signal; and
using the identified phase to adjust the phase of the second wireless signal.

9. The method as in claim 1, wherein transmitting the second wireless signal from the repeater wireless station includes:
transmitting the second wireless signal from the repeater wireless station in a same direction as the first wireless signal.

10. The method as in claim 1 further comprising:
receiving the notification in response to a sensor detecting that the wireless interference in the network environment is above a threshold level.

11. The method as in claim 1 further comprising:
receiving the notification from the wireless base station based on a location of the repeater wireless station with respect to the wireless base station.

12. The method as in claim 1, wherein transmitting the second wireless signal from the repeater wireless station includes:
transmitting the second wireless signal from the repeater wireless station in a same direction as the first wireless station.

13. The method as in claim 1 further comprising:
communicating a location of the repeater wireless station to the wireless base station.

14. The method as in claim 1, wherein the notification is a command from the wireless base station controlling operation of the repeater wireless station to implement the phase shifting.

15. The method as in claim 1, wherein the repeater wireless station is registered with a spectrum access system to use a first wireless channel to transmit the second wireless signal.

16. The method as in claim 15, wherein the first wireless channel is allocated from a tiered hierarchy in which an incumbent entity has higher priority rights to use the first wireless channel than the repeater wireless station.

17. The method as in claim 1 further comprising:
transmitting a communication from the repeater wireless station to the wireless base station, the communication indicating that the repeater wireless station supports wireless signal replication.

18. The method as in claim 1, wherein the second wireless signal is a phase-shifted replica of the first wireless signal.

19. A system comprising:
a repeater wireless station operative to:
receive a first wireless signal from a wireless base station;
transmit a second wireless signal from the repeater wireless station, the second wireless signal being a reproduction of the first wireless signal; and
wherein the second wireless signal is phase-shifted in time with respect to the first wireless signal in response to receiving notification from the wireless base station, the second wireless signal phase shifted with respect to the first wireless station to reduce wireless interference in the network environment.

20. The system as in claim 19, wherein the repeater wireless station is further operative to:
receive the notification in response to a sensor detecting the wireless interference above a threshold level, the wireless interference caused by the first wireless signal.

21. The system as in claim 19, wherein the wireless interference is caused by the first wireless signal transmitted from the wireless base station.

22. The system as in claim 19, wherein the wireless interference is caused by the first wireless signal; and wherein the phase shifted second wireless signal at least partially cancels the wireless interference caused by the first wireless signal.

23. The system as in claim 19, wherein the repeater wireless station is further operative to:
vary a magnitude of a phase shift between the second wireless signal and the first wireless signal.

24. The system as in claim 19, wherein the repeater wireless station is further operative to:
register the wireless base station with an allocation management resource for allocation of a wireless channel in which to transmit the first wireless signal.

25. The system as in claim 19, wherein a phase shift of the second wireless signal with respect to the first wireless signal is between 170 and 190 degrees.

26. The system as in claim 19, wherein the repeater wireless station is further operative to:
identify a phase of the received first wireless signal; and
use the identified phase to adjust the phase of the second wireless signal.

27. The system as in claim 19, wherein the repeater wireless station is further operative to:
transmit the second wireless signal from the repeater wireless station in a same direction as the first wireless signal.

28. Computer-readable storage hardware having instructions stored thereon, the instructions, when carried out by computer processor hardware, cause the computer processor hardware to manage operation of a repeater wireless station, the repeater wireless station operative to:
receive a first wireless signal from a wireless base station;
transmit a second wireless signal from the repeater wireless station, the second wireless signal being a reproduction of the first wireless signal; and
wherein the second wireless signal is phase-shifted in time with respect to the first wireless signal in response to receiving notification from the wireless base station, the second wireless signal phase-shifted in time with respect to the first wireless signal via the communication processor hardware to reduce wireless interference in the network environment.

* * * * *